Dec. 12, 1967 O. L. KUEHN 3,357,714

DEVICE TO ASSIST IN TEACHING SKIING

Filed March 15, 1965 4 Sheets-Sheet 1

INVENTOR.
OTTO L. KUEHN

BY [signature]
ATTORNEY

DEVICE TO ASSIST IN TEACHING SKIING

Filed March 15, 1965 4 Sheets-Sheet 2

INVENTOR
OTTO L. KUEHN
BY
ATTORNEY

Dec. 12, 1967 O. L. KUEHN 3,357,714

DEVICE TO ASSIST IN TEACHING SKIING

Filed March 15, 1965 4 Sheets-Sheet 3

INVENTOR.
OTTO L. KUEHN
BY
ATTORNEY

Dec. 12, 1967 O. L. KUEHN 3,357,714

DEVICE TO ASSIST IN TEACHING SKIING

Filed March 15, 1965 4 Sheets-Sheet 4

INVENTOR.
OTTO L. KUEHN
BY
ATTORNEY

United States Patent Office 3,357,714

Patented Dec. 12, 1967

3,357,714
DEVICE TO ASSIST IN TEACHNG SKIING
Otto L. Kuehn, Vail, Colo. 81657
Filed Mar. 15, 1965, Ser. No. 439,821
19 Claims. (Cl. 280—11.37)

ABSTRACT OF THE DISCLOSURE

A pair of skis (snow or water) is provided with a link extending from a member which upstands from one of the skis to a member which upstands from the other of the skis. Only one such link is provided and the upstanding members are located near the inner edges of the skis and near the points of inflection of the skis. The joints between the links and the upstanding member are preferably hingeable in all directions.

This invention relates to a device to be attached to snow skis or water skis to assist students or novices to learn to ski on snow or water and to assist instructors or mentors in suitably instructing such students or novices.

It is an essential feature of my invention that the skis are not caused by the device to remain parallel or in the same plane. It is an essential feature of skis that they are attached to the feet of skiers.

It is therefore an object of my invention to provide a device which suitably attaches together the two skis which are independently attached to the two feet of a skier to assist the skier in learning to ski.

It is another object to provide such device which causes forward portions of the skis to remain a substantially constant distance apart from each other but does not cause them to remain parallel.

It is another object to provide a device which maintains forward portions near the tips of a pair of skis (attached to a skier's feet) at a constant spaced apart distance without causing the skis, when parallel, to remain at a constant spaced apart distance.

It is another object of the invention to provide a pair of skis attached to the feet of a skier and devoid of handles or hand-holds and a link also devoid of hand-holds connecting forward portions near the tips of the skis to maintain the points of attachment at a constant distance apart but to allow the skis to move relative to each other in all directions.

Another object is to provide such a device which minimizes the danger of breaking a leg in a fall, by preventing one leg from straying out to one side and then becoming twisted and thus broken as the skier tumbles down hill.

It has been heretofore proposed to provide a pair of sled runners independent of each other except for a link attaching the leading edges of the runners together which are maintained vertical mainly by hand-hold members extending upward from each of the runners, each of the runners being provided with a foot support so that the user may freely stand on the foot supports or on one foot support or the other while walking with the other foot without either runner being attached to either foot or may walk between the two runners without attaching the runners to his feet. Such a device is useless for the purpose and objects herein set forth because the runners cannot be rotated by rotation of the body and consequent rotation of the feet to facilitate turns and cannot be lifted from the surface together or independently by means of the feet to facilitate turns. Essential maneuvers of skiing such as snow plowing and stemming and making stem turns, parallel ski turns and jump turns cannot be accomplished with such a device.

The device of the invention furthermore is an improvement on devices previously proposed for attaching to skis to facilitate learning to ski.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

In accordance with a preferred embodiment of the invention a link is provided which connects a pair of water skis or snow skis.

It is significant and critical to the invention that the joints at the end of the link be hingeable to rotate in two planes in the manner of a universal joint or ball and socket joint.

It is also essential that the points of attachment of the links be near and slightly abaft the points of inflection of the skis and at or near the inner edge of the ski at an elevated distance above the surfaces of the skis.

It is essential and critical to the invention that the skis be connected by only one link.

It is desirable that the link and the means which provide said joints and provide for elevation of the joints above the surface of the ski be readily removable from the skis.

It is essential for the novice to learn to "snow-plow" to effect a braking action while traveling straight down hill or while traversing at an angle to the "fall-line" of the hill in a downward direction. The fall line of a hill is the path that a free rolling object would take if allowed to roll unobstructed down the incline in question. It is also important that the beginner learns to traverse across the face of the hill in a downward direction with his skis essentially in a parallel position. This is accomplished by skiing at an angle of approximately 10 degrees to 80 degrees away from the fall line of the hill. The greater the angle at which the skier skis away from the fall line, the slower his speed will be. Therefore it is important for the novice to learn to traverse with his skis in a parallel position since it is so effective in controlling his speed. Thirdly, it is necessary for the beginner to learn to turn in order to avoid other skiers or natural obstacles and also merely to change his direction of descent as in the case when the skier traverses from one side of the hill to the other side and back again in a path producing a continuing series of S's in his travel down the slope.

I have recognized that the three basic maneuvers described above (snow-plowing, traversing and turning) all have a common feature as far as the relative position of the two skis are concerned. The feature referred to is that if portions near the tips of the skis are controlled so that they remain at a fixed, relatively short distance from each other, each of the maneuvers will present a minimum of difficulty.

Figure 1:
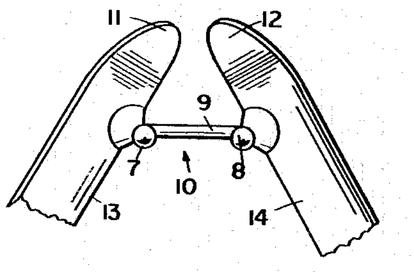
FIGURE 1 is a schematic plan veiw of the forward portions of a pair of skis provided with the device of the invention during the maneuver known as snow plowing.
Figure 2:
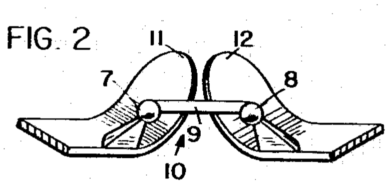
FIGURE 2 is an elevation from the rear of the maneuver of FIGURE 1.

FIGURES 1 and 2 show how the device indicated generally as 10 (and comprising joints 7 and 8 and link 9) keeps the tips 11 and 12 of the skis 13 and 14 in proper position when the skier is snowplowing. Snowplowing is accomplished by keeping the tips together while pressing the heels of the skis apart and at the same time tipping the skis inward (as shown) in order to literally plow the snow. The great tendency in this maneuver is for both of the skis to spread wide apart, for the tips to point out in opposite directions, or else for the tips to cross each other. In any case, it leads to an uncomfortable fall for the novice. The device of the invention prevents most of the worst such errors which can be committed by a novice, while tending to maintain the skis in the necessary relation.

Figure 3:
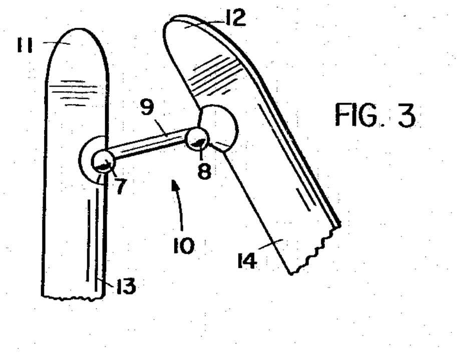
FIGURE 3 is a schematic plan view of the forward portions of a pair of skis provided with the invention during the maneuver known as stemming, the right hand ski being stemmed uphill.
Figure 4:
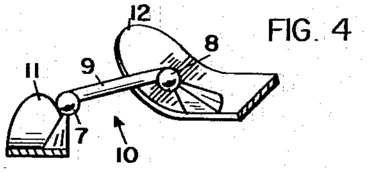
FIGURE 4 is an elevation from the rear of the maneuver of FIGURE 3.

Referring now to FIGURES 3 and 4, the positions of the skis are shown when making a stem turn. The skis are in proper position and the device of the invention greatly facilitates the efforts of a novice in maintaining them in this position during the critical early portion of the turn.

Figure 5:
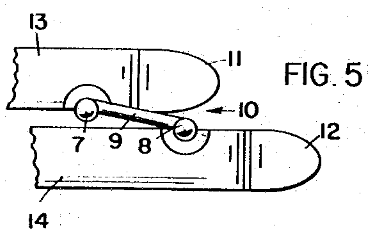
FIGURE 5 is a schematic plan view of the forward portions of a pair of skis provided with the invention during the maneuver known as traversing.

FIGURE 5 illustrates how the device functions when the skier is traversing across the face of the slope or parallel skiing down the fall line of the slope. It is good skiing practice to ease the uphill ski 14 (when traversing) slightly forward to gain additional stability. In addition to this it better prepares the skier for making a maneuver—either turning or stopping. This same position is highly advisable when skiing straight down the fall line, for the same reasons. Now, it can be noted that with the device of the invention, as the skier brings his skis together in a parallel position, he automatically will have to ease one of his skis forward. Conversely, if he eases one of his skis forward when skiing straight down the fall line or when he moves his uphill ski forward when traversing, the device will automatically tend to bring his skis together in a parallel position.

Figure 6:
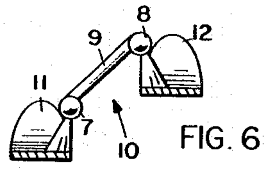
FIGURE 6 is an elevation from the rear of the maneuver of FIGURE 5.
Figure 7:
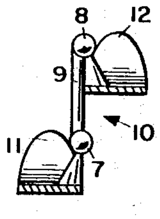
FIGURE 7 is a view corresponding to FIGURE 6, showing the skis on a very steep slope and illustrating the need for the pivoted attachment points to be near or slightly outward from the inner edge of the ski.
Figure 10:
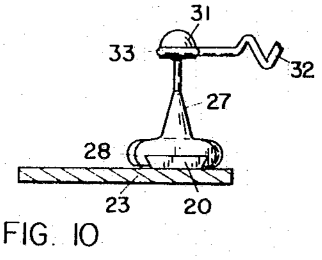
FIGURE 10 is a partially cross-sectional elevation of a right ski having one embodiment applied thereto, taken from the front.
Figure 11:
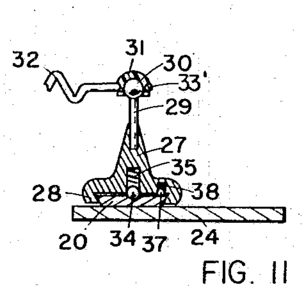
FIGURE 11 is a cross-sectional elevation of a left ski having the embodiment of FIGURE 10 applied thereto, taken from the front, so that FIGURES 10 and 11 cooperate to show the entire device in accordance with one embodiment, applied to a pair of skis.

Referring now to FIGURES 5, 6 and 7, it will be noted that the skis may travel across the slope at different levels such as may be the case when the skier is traversing across the slope at which time the up-hill ski will normally ride above the down-hill ski. The device will easily permit this action and yet will partially control the relative position of the two skis so that they tend to be maintained in the proper relationship.

Figure 8:
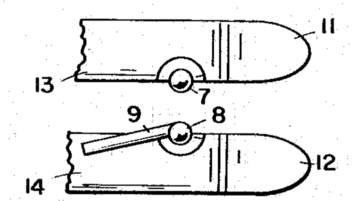
FIGURE 8 is a schematic plan view of the forward portions of a pair of skis, with the device of the invention disconnected.
Figure 9:
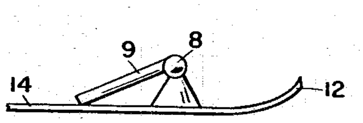
FIGURE 9 is a side view of the forward portion of one ski provided with the device of the invention disconnected from the other ski and having the disconnected end of the device resting on the ski to permit walking on the skis, to permit being towed or carried by a ski tow or ski lift, and permit herringboning up a slope or going cross-country on the skis.

FIGURES 8 and 9 illustrate the device in a disconnected position lying on one ski to serve more or less as a storage place during certain periods of the skiing day. The free end of the link might, if desired, be attached to a suitable fitting which might be provided on the surface of the ski. These periods include: while walking on the skis, riding up a ski tow or ski lift, herringboning up a slope, or while going cross country on the skis.

Further, the device may also be disconnected from both skis and the removed portion may be stored in the skier's pocket or in a suitable carrying case attached to the skier's belt.

Water skiing possesses many of the same problems inherent in the sport of snow skiing. However, the problems are somewhat less complicated due to the fact that the water skier remains on a level surface for all practical purposes. He does encounter waves but the nature of the device permits complete maneuverability on the roughest of water.

The largest difficulty for the beginning water skier is to get started behind the boat, either while floating in the water, standing on the bottom of the lake near the shore, or sitting at the end of a dock with his skis dangling in the water. In any of the three cases mentioned, the greatest problem encountered is to maintain a constant distance between the forward portions of the water skis. If the skis are permitted to cross at or near the tips, it is almost impossible to avoid a spill, even for an experienced skier. A spill is also almost inevitable for a novice if the tips of the skis diverge, causing the water skier to do "the splits." When the beginner water skier is forced to concentrate on maintaining the correct distance between the tips of his skis, it is even more difficult for him simply to retain his balance. It may also be noted that it is necessary for the towing motor boat to attain a minimum speed quite quickly (accelerate rapidly) so that the water skis support the beginning water skier entirely on the surface of the water before he falls due to the drag of the partially submerged skis at the lower speeds. This speed will vary with the size, and consequently the age, of the water skier. But the necessary rapid acceleration often causes the novice skier to be pulled over forward before he acquires proper skiing position. With a smaller skier of course, less speed is required to support him on the surface of the water. However any given speed will seem faster to a smaller skier than it will to a larger skier. By use of the device of the invention, a novice can control the skis while they are still partially submerged and it is not necessary for the towing boat to accelerate at such high speeds. The connecting link is preferably a little longer when the device is used for water skiing. This is due to the fact that the normal position of the two water skis, when tracking parallel, is somewhat farther apart than are corresponding snow skis. To facilitate adjustment to these varying circumstances, the connecting rod may be adjustable in length, but it is preferably of constant length so that arbitrary adjustments by the novice which may cause him difficulty will be prevented.

Referring now to FIGURES 10, 11, 12 and 13, there is shown an embodiment. One of plates 20 is attached by screws extending from the bottom of the ski and threadedly engaged with threaded holes 21 to each of skis 23 and 24. Sides 22 and 22' of plate 20 may be flat and vertical, but edges 25 and 26 are disposed opposite each other and extend upward and outwardly, that is, diverge upwardly and outwardly. These edges are arcuate so that each of members 27 which may be of metal or plastic may be placed over one of plates 20 with the arcuate inwardly and downwardly extending portions 28 of member 27 disposed opposite flat surfaces 22 and 22'. Each member 27 may then be attached to one of plates 20 by rotating member 27 about 90° to engage portions 28 of members 27 with edges 25 and 26 of members 20. Each of members 27 may be provided with an upwardly extending portion 29 which may terminate in a ball 30; parts 29 and balls 30 are preferably of metal. The balls are preferably highly polished. Each of balls 30 is preferably received in a plastic member 31 which may be of nylon, polyethylene, polycarbonate or the like, and which rotatably receives balls 30 to provide a ball and socket joint. Spring 32 is provided with a loop 33 and 33' at each of its ends. Each of loops 33 and 33' encircles one of members 31, to hold the skirt or lower portion of members 31 engaged with one of balls 30. Spring 32 provides connecting means to connect the ball joints provided by members 30 and 31.

Each of members 27 is provided at the center of its bottom surface with a ball 34 which is biased downwardly by spring 35 and is received in hole or aperture 36 in the center of plate 20 to provide for the proper spacial location of each of members 27 with respect to plate 20 prior to rotatively engaging the two to attach them together. Each of members 27 is also provided with another small ball 37 biased downwardly by spring 38. Ball 37 extends downwardly from the bottom interior surface of member 27 and when member 27 is rotatively engaged with plate 20, ball 37 is received in groove 39 contained in plate 20 to prevent rotative disengagement of member 27 from member 20 except when member 27 is manually rotated with sufficient force to overcome the downward biasing action of spring 38.

Figures 12, 13, 14, 15, 16, 18:
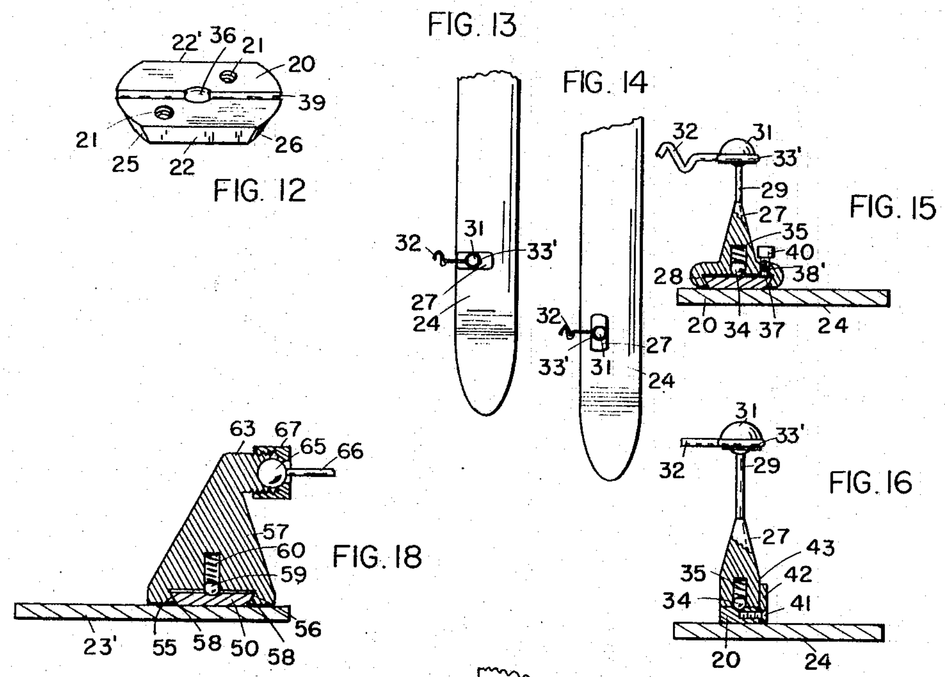
FIGURE 12 is a perspective view of one element of the embodiment of FIGURES 10 and 11.
FIGURE 13 is a partially cutaway plan view of the embodiment of FIGURE 11.
FIGURE 14 is a partially cutaway plan view of a modified application of the embodiment of FIGURE 11.
FIGURE 15 is a cross-sectional elevation corresponding to FIGURE 11 of a modification of the embodiment of FIGURE 11.
FIGURE 16 is a cross-sectional view taken from the front of a left ski having a modification of the embodiments of FIGURES 10 and 11 applied thereto and the orientation shown in FIGURE 14.
FIGURE 18 is a cross-sectional view of a left ski having a further modified form of the embodiment of FIGURES 10 and 11 applied thereto, taken from the front and thus corresponding to the view in FIGURE 10.

As shown in FIGURE 14, each of members 20 may be mounted on its respective ski so that it extends longitudinally instead of laterally, if desired.

As shown in FIGURE 15, the embodiment of FIGURES 10 to 14 may be modified by providing a screw 40 with which the downward biasing force of spring 38' which corresponds to spring 38 may be varied by turning the screw in or out. All other parts of this modification are the same as those of FIGURES 10 to 14.

Figure 17:
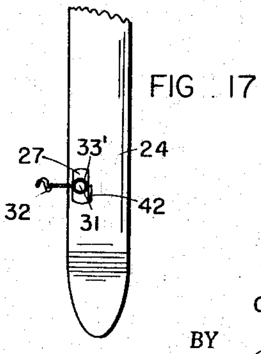
FIGURE 17 is a plan view of the embodiment of FIGURE 16.

As shown in FIGURES 16 and 17, the embodiment of FIGURES 10 to 14 may be modified by attaching to each of members 20, by means such as screws 41, a plate 42 which may engage portion 43 of each of members 27 when each of members 27 is rotated the proper amount, while rotatively engaging member 27 with member 20 to provide for maximum engagement with the two members and to supplement the action of ball 37 acting on groove 39 to prevent accidental disengagement of member 27 from member 20 by entirely blocking such rotative engagement in one rotational direction.

Each of members 20 is preferably attached to a ski immediately to the rear of the point of inflection of the ski and as near as possible to the edge of the ski, that is, between the center line of the ski and as near the inner edge as possible without providing an impediment extending over the inner edge. The point of inflection is the point at which the ski ceases to be substantially flat and starts to curve upward to the tip. Thus, each of members 20 is attached to the forwardmost portion of the flat portion of the ski. The length of the connecting means is preferably about equal or slightly less than equal to the distance from the tip of each ski to the point of attachment of member 20. It may be rigid; it may be adjustable in length. However, preferably it is a spring having a spring constant between 40 pounds per inch and 100 pounds per inch.

Figure 19:
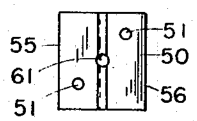
FIGURE 19 is a plan view of one element of the embodiment of FIGURE 18.

Referring now to FIGURES 18 and 19, there is shown a modification wherein plate 50 is attached to a ski such as ski 23' by screws extending upwardly through the ski and engaging in threaded holes 51. Plate 50 is substantially rectangular in plan view, and two opposite edges 55 and 56 diverge upwardly and outwardly. Vertically extending member 57 is provided at its lower end with downwardly and inwardly extending portions 58 which are linearly slidingly engageable with surfaces 55 and 56 of member 52 to provide for attachment of member 57 to member 50. At or near the center of the flat bottom surface of member 57 there may be provided a downwardly projecting ball 59 which may be biased downwardly by spring 60 so that ball 59 may yieldingly engage in hole or aperture 61 in member 50 to prevent accidental linear sliding removal of member 57 from plate 50. The upper portion 63 of member 57 extends laterally toward the inner edge of the ski and preferably extends at least as far as shown or preferably even further so that it extends over the inner edge of the ski and may be provided at its end with a cavity adapted to receive ball 65 which may be attached to a suitable portion 66 of any suitable connecting means such as spring 32. Ball 65 may be held in place in such cavity by a threaded retainer member 67 which may be threadedly engaged with threads on the exterior of portion 63.

Figures 20, 21, 22, 23, 24, 25:
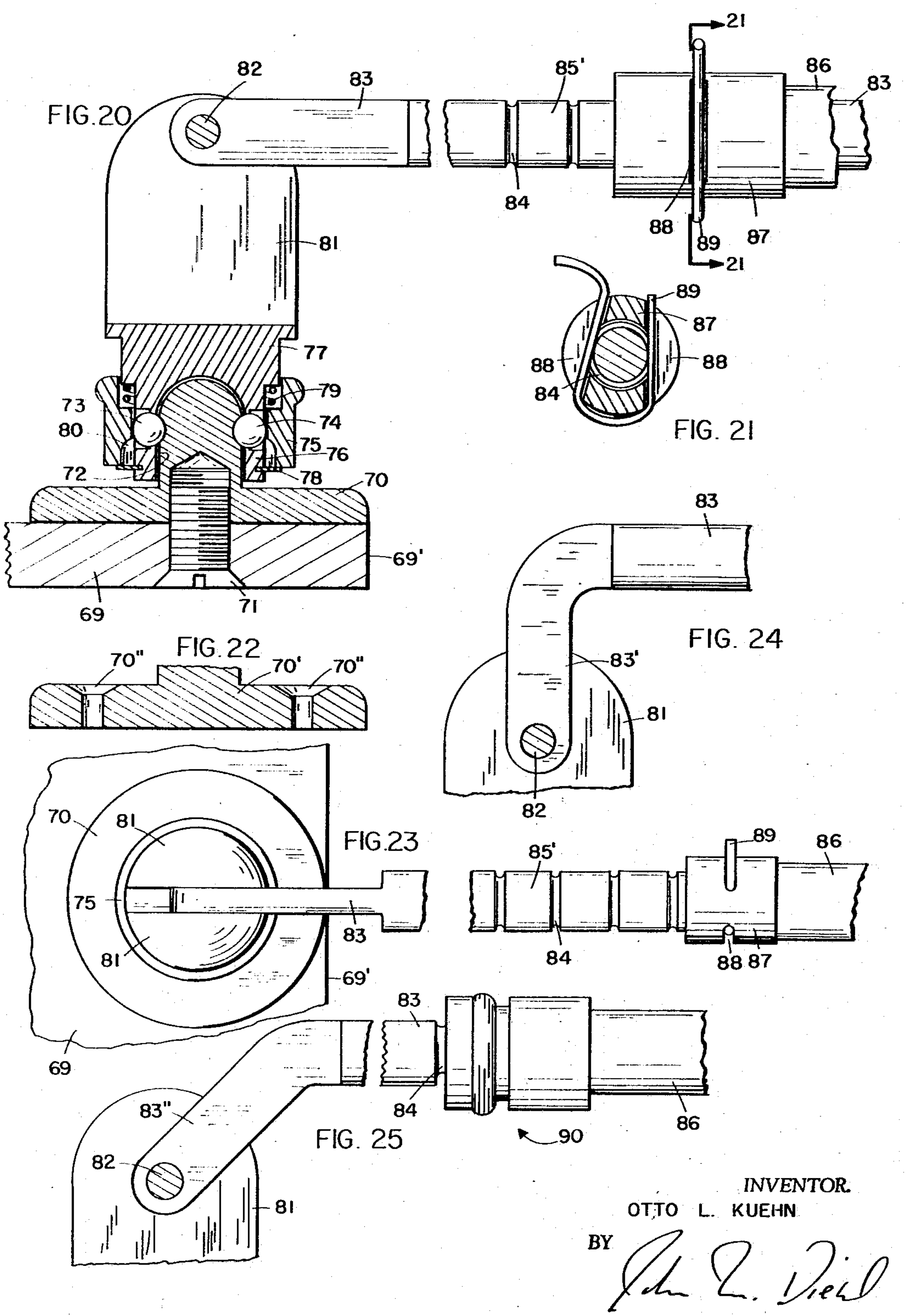
FIGURE 20 is a partially cross-sectional view of a portion of an other embodiment.
FIGURE 21 is a cross-sectional view of a portion of FIGURE 20 taken on lines 21—21.
FIGURE 22 is a fragmentary cross-sectional view of a portion of the embodiment of FIGURE 20 showing a modified form.
FIGURE 23 is a plan view of the embodiment of FIGURE 20.
FIGURE 24 is an elevation corresponding to FIGURE 20 of a modified form of a portion thereof.
FIGURE 25 is a partially cross-sectional elevation corresponding to FIGURE 20 of a modified form of a portion of the embodiment of FIGURE 20.

Referring now to FIGURES 20, 21 and 23, there is shown another embodiment wherein member 70 is attached to ski 69 by screw 71 near the inner edge 69' of ski 69 on the flat part of the ski near the point of inflection, (not shown) of the ski. Member 70 is provided with upstanding cylindrical portion 72 in which there is provided circular groove 73 which receives balls 74; balls 74 are held in place in engaged relation with groove 73 by member 75 which serves as the outer race of a ball bearing of which groove 73 serves as the inner race and which comprises balls 74. Ring 75 is slidingly engaged with downwardly extending portion 76 of member 77 and is held in place thereon by snap ring 78. Ring 75 is biased downwardly by spring 79, and may therefore be lifted upwardly by the operator to compress spring 79 and bring annular aperture 80 opposite the balls. The balls then fall outwardly into aperture 80 and member 77 may be removed upwardly from member 70. Extending upwardly as the upper portion of member 77 there are provided bifurcated portions 81 having pin 82 extending between them. Rod 83 is journaled at one of its ends on pin 82. The surface of rod or connector link 83 may be cylindrical as at 85' and may have a plurality of circular grooves 84 interrupting its surface at suitably spaced intervals. Tube 86 may slidably receive rod 83 and may have attached to its end a collar 87 which may have slots 88 cut in opposite sides thereof. Received in slots 88 there may be provided wire spring clip 89 which may engage with ring grooves 84 to prevent lateral movement of rod 83 with respect to tube 86. Tube 86 at its right end may be connected (in the same manner that rod 83 is connected) to a member corresponding to member 77 which may be connected to another ski corresponding to ski 69, near the inner edge of said ski, that is, between the center line of said ski and the inner edge of said ski but at sufficient distance from the inner edge of said ski to provide an unimpeded inner edge thereof, and being attached on the flat part of the ski near the point of inflection of the ski.

The effective length of the connecting means extending between the skis which comprises rod 83 and tube 86 may be varied by operation of spring clip 89 to cause it to engage with any one of grooves 84 which may be suitable to provide the desired effective length.

Referring now to FIGURE 22, there is shown a modified form of the lower portion of member 70 indicated as 75 which may be fastened to a ski by screws extending downwardly through screw holes 70'' to prevent interrupting the bottom of the ski in the manner in which the head of screw 71 interrupts the bottom surface of ski 69.

As shown in FIGURE 24, the effective height of the connecting means comprising rod 83 and tube 86, above the snow or water surface may be increased by providing a downwardly extending portion 83' at the end of rod 83 and a corresponding downwardly extending portion (not shown for simplicity) at the right end of tube 86.

Referring now to FIGURE 25, there is shown a modification of the embodiment of FIGURE 24 wherein, in place of downwardly extending portion 83' there is provided extending portion 83'' and in place of the adjustable connecting means provided by wire clip 89, there is provided on the end of tube 86 a ball detent locking device comparable to that described for connecting member 77 to member 70 indicated generally as 90.

Figure 26:
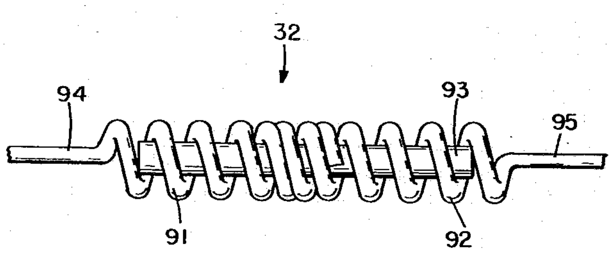
FIGURE 26 is an elevation of a modified form of connecting link which is adjustable in length.

Referring now to FIGURE 26, there is shown connecting means which may be substituted for spring 32 or the connecting means comprising rod 83 and tube 86 which is variable in length in very small steps and comprises two intertwisted helical springs 91 and 92 provided with a central locating member such as rod 93 which may be of a suitable plastic such as nylon. The left end 94 of spring 91 and the right end of 95 of spring 92 may be suitably connected either to an upstanding portion such as portion 81 or to a ball joint portion such as member 31. To change the length of the connecting means it is only necessary to disengage the member corresponding to member 77 from a member such as member 70 to which it is attached or correspondingly to disengage a member such as member 27 from a member 20 to which it is attached and then to rotate the end of the spring to which the disengaged member is attached one turn in either direction and then reattach the previously disattached member. The connecting means is correspondingly lengthened or shortened by an amount equal to the reciprocal of the pitch of the springs.

While certain modifications and embodiments of the invention have been described, it is of course to be understood that there are a great number of variations which will suggest themselves to anyone familiar with the subject matter thereof and it is to be distinctly understood that the invention should not be limited except by such limitations as are clearly imposed in the appended claims.

I claim:

1. The combination to assist in learning to ski which comprises means to provide a substantially fixed spaced relation between points above the surface of said skis and to provide for independent rotation of the skis about their center lines and independent angulation by divergence of the heels of the skis so that no part of the skis are maintained parallel, said means comprising:

a right ski having a tip and a point of inflection, a left ski having a tip and a point of inflection, first means attachable to the upper surface of the right ski near its point of inflection between its center line and its inner edge to provide an unimpeded inner edge in contact with the surface underlying the ski and substantially unimpeded bottom surface, second means attachable to the upper surface of the left ski near its point of inflection between its center line and its inner edge to provide an unimpeded inner edge in contact with the surface underlying the ski and substantially unimpeded bottom surface, a member removably attachable to said first means and extending upward to a first biplanar joint;

a member removably attachable to said second means and extending upward to a second biplanar joint, a single connecting means extending from said first joint to said second joint to connect said joints and space said joints a substantially fixed distance apart, said skis being connected only by said single connecting means, the centers of said biplanar joints being respectively substantially directly over the inner edges of the skis.

2. The device of claim 1 wherein said biplanar joints are ball and socket joints.

3. The device of claim 1 wherein said connecting means is adjustable in length.

4. The device of claim 1 wherein said connecting means is a relatively rigid spring.

5. The device of claim 4 wherein said spring is a spring having a spring constant between 40 lbs./in. and 100 lbs./in.

6. The device of claim 5 wherein the length of said connecting means is slightly less than the distance from the front of the tip of each ski to the points of attachment of said first and second means respectively.

7. The device of claim 1 wherein the length of said connecting means is slightly less than the distance from the front of the tip of each ski to the points of attachment of said first and second means respectively.

8. The device of claim 7 wherein each of said first and second means is a plate having two opposite upwardly outwardly diverging edges which engage corresponding inwardly downwardly extending edge portions of one of said removably attachable members.

9. The device of claim 8 wherein said edges of said plate and said edge portions of said attachable member are linearly slidingly engaged.

10. The device of claim 9 wherein the lower surface of said attachable member is provided with a downwardly extending ball, said ball being biased downwardly by a spring, and said plate is provided with a transverse groove in its upper surface and said attachable member is maintained removably attached to said plate by engagement of said ball in said groove.

11. The device of claim 8 wherein said edges of said plate and said edge portions of said attachable member are arcuate and are rotatively slidingly engaged .

12. The device of claim 11 wherein said lower surface of said attachable member is provided with a downwardly extending ball, said ball being biased downwardly by a spring, and said plate is provided with a transverse groove in its upper surface and said attachable member is maintained removably attached to said plate by engagement of said ball in said groove.

13. The device of claim 12 wherein the lower surface of said attachable member is provided with a second downwardly extending ball substantially at the center of said surface, said ball being biased downwardly by a second spring, and said second ball is received in a recess substantially in the center of the upper surface of said plate.

14. The device of claim 12 wherein one end of said spring is seated against a screw and said screw may be rotated to vary the biasing pressure of said spring on said ball.

15. The device of claim 12 wherein said attachable member is provided with a stop adjacent one end of one of said edge portions which provides said rotative sliding engagement to halt rotation at a predetermined point.

16. The device of claim 11 wherein said attachable member is provided with a stop adjacent one end of one of said edge portions which provides said rotative sliding engagement to halt rotation at a predetermined point.

17. The device of claim 1 wherein each of said first and second means is a plate having two opposite upwardly outwardly diverging edges which engage correspondingly inwardly downwardly extending edge portions of one of said removably attachable members.

18. The device of claim 17 wherein said edges of said plate and said edge portions of said attachable member are linearly slidingly engaged.

19. The device of claim 17 wherein said edges of said plate and said edge portions of said attachable member are rotatively slidingly engaged.

References Cited

UNITED STATES PATENTS 1,834,979 12/1931 Skoglund ------------ 280—12
3,171,667 3/1965 Wightman ----------- 280—21

FOREIGN PATENTS 1,074,921 4/1954 France.

BENJAMIN HERSH, *Primary Examiner.*

MILTON L. SMITH, *Examiner.*